Patented June 30, 1953

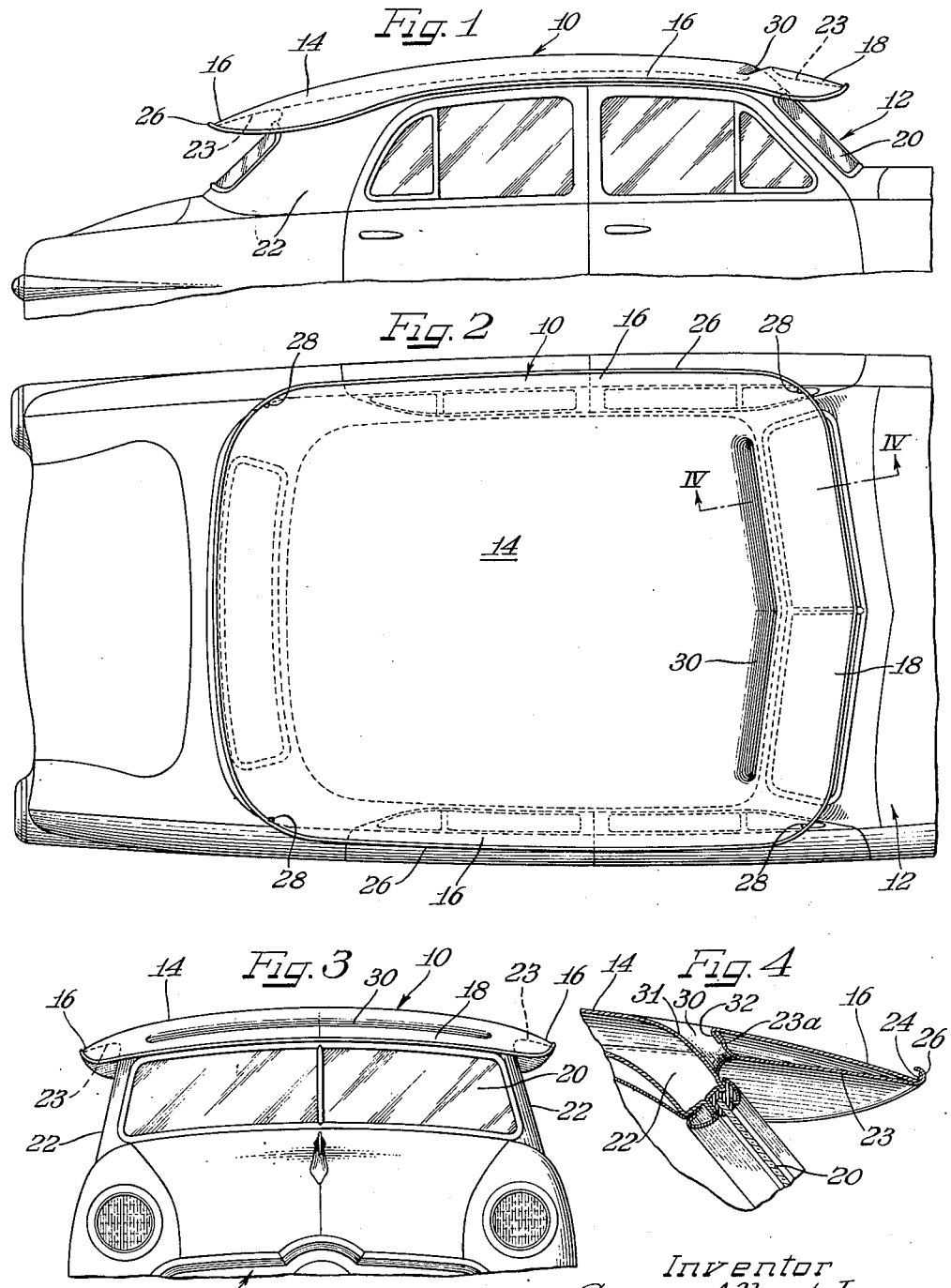

2,643,913

UNITED STATES PATENT OFFICE 2,643,913

AUTOMOBILE ROOF CONSTRUCTION

George Albert Lyon, Detroit, Mich.

Application October 13, 1949, Serial No. 121,120

11 Claims. (Cl. 296—137)

This invention relates to a roof construction for automobiles, trucks and the like, and has particular utility as a shield for reflecting heat waves, for inclement weather usages and for cooling the vehicle as well as providing the top wall for the vehicle body.

The present day, conventionally designed automobile has a roof construction integrally formed with the rest of the body portion in a streamlined manner so as not to deviate from the design trend of smoothly curving symmetrical lines.

Streamlined, symmetrically designed automobile bodies and roof constructions have been subject to certain inherent disadvantages. In keeping with the streamlining and vehicle design, the windowed portions of the automobile body have been exposed to a greater degree to the sun rays, rain, snow, sleet and the like. Further, in keeping with the modern design, the trend is to lessen the vertical dimensions of the body, thereby placing the occupants nearer the roof. This, of course, is apt to increase the discomfort of the occupants due to the heat absorbed by the roof from the sun rays. Most of the paints used on automobiles do not have pigments having heat reflection characteristics. Therefore, it is desirable to have the roof of the automobile body so designed as to offer the greatest shading and cooling characteristics possible.

Accordingly, it is an object of this invention to provide a roof construction for vehicles which will deflect sun rays and thereby diminish passenger discomfort due to sun ray heat and excessive light.

Another object of this invention is to provide an automobile roof construction with an integrally formed shield structure which will deflect rain, snow, sleet and the like from about the periphery of the automobile body and thereby shelter the various window openings.

Another object of this invention is to provide an integral roof construction which will shelter the periphery of the body of the vehicle.

Another object of this invention is to provide a roof construction for automotive vehicles which incorporates integrally formed visors for the window portions of the body.

A still further object of this invention is to provide a vehicle roof construction which will control the passage of air therearound in a manner to cool the body of the vehicle.

According to the general features of the present invention, there is provided a vehicle body comprising front, rear and side walls having window openings, a panel providing the top structure for the body, and shields extending outwardly beyond the body walls so as to protectively overhang the window openings to provide visor structures therefor.

In further accord to the general features of the present invention there is provided in a roof shield construction for a vehicle body, a turtleback top shell have marginal portions adapted to extend beyond the walls of the body and having means adjacent the front end of the shell defining an air relief passage.

Other objects and features of this invention will more fully appear from the following detailed description taken in conjunction with the accompanying drawing which illustrates one embodiment thereof, and in which:

Figure 1 is a fragmentary side view of an automobile having a roof construction which embraces the features of this invention;

Figure 2 is a fragmentary top view of the automobile of Figure 1, showing a top plan view of the roof construction;

Figure 3 is a front view of the automobile; and

Figure 4 is a fragmentary, cross-sectional view taken substantially on the line IV—IV of Figure 2 looking in the direction of the arrows, showing the roof construction adjacent the front windshield wherein the air release slot is disposed.

As shown on the drawing:

The reference numeral 10 designates generally a top or roof construction of this invention. In the various figures of the drawing, the roof 10 is illustrated as being part of the body of an automobile 12.

The top portion 14 of the roof construction 10 is of generally turtle-back configuration, and conforms to the symmetrical lines of the streamlining of the automobile 12. The top portion 14 may be manufactured on a production basis from light weight sheet metal as by a forming or drawing process. The top 14 is sufficiently large so that the outer periphery 16 thereof extends as a deflector or visor structure beyond the front, side and rear walls of the automobile 12. The portion of the outer periphery of the top 14 which projects over the front of the automobile body provides a front visor 18 for the windshield 20 of the automobile.

As best seen with reference to Figures 3 and 4, the sheet metal forming the side, front and rear walls 22 of the automobile is formed with an outwardly extending upper flange structure 23 which is joined to the top portion 10 at the outer periphery 16. This joinder may be effected in any suitable manner as by nesting an upwardly open bead-like curled edge 24 on the top 14 within a similarly upwardly open bead-like curled edge 26 formed on the outer periphery of the side wall flange 23. The turtle-back top dips toward the sides and the front and rear portions of the body and the connecting beads 24 and 26 cooperate to form a gutter about the top 14 which, as illustrated in Figure 2, has drain holes 28 circumferentially spaced to rid the top of run-off moisture collected by the gutter at the lowermost portions of the top 14.

An air relief passage 30 is provided in the top 14 adjacent the front visor 18 to relieve air which would ordinarily be trapped beneath the visor or canopy 18. As seen in Figure 4, the air relief vent 30 is provided by striking the section 31 from the top 14 and bending it downwardly to be secured within the windshield mount. The opposing edge 32 of the air opening 30 is bent downwardly and secures a struck portion 23a which is bent upwardly from the outwardly extending flange 23.

It is obvious from the foregoing that there is here provided an integral top wall construction for a vehicle body which provides an extending shield or visor about the front, rear and side wall portions of the body and which is vented to pass air over the vehicle for cooling and which may be painted in highly efficient reflectant pigments.

It will be further understood that modifications and variations may be effected without departing from the scope of the novel concepts of the present invention.

I claim as my invention:

1. In an automobile, a body comprising front, rear and side walls having windows, a panel of generally turtle-back configuration having sloping marginal portions providing the roof of the automobile, outwardly flanged portions on said body walls, an upwardly open curled edge on said flanged portion in internested cooperation with an upwardly open curled edge on said roof panel margin to form a gutter, said flanged portion and said marginal portion cooperating to provide a visor structure protectively overhanging the windows.

2. In an automobile, a body comprising front, rear and side walls having windows, a top panel of generally turtle-back configuration having marginal portions extending beyond the side walls of said body and secured thereto in a manner to provide a visor protective structure overhanging the windows, means on the front end of said top panel providing an aperture adjacent and above the front wall of said body for the passage of air, means on said top panel providing a gutter about said marginal portions, and means defined by said top panel adjacent said gutter providing an aperture for drainage of liquids from said gutter.

3. In an automobile, a body comprising front, rear and side walls having windows, a top panel of generally turtle-back configuration having outwardly and downwardly sloping margins, upwardly and outwardly flanged portions on said body walls, means on said body wall flanges and said top panel margins providing a curled edge gutter for said top panel and securing said top panel to said side walls, said gutter sloping downwardly towards the front and rear portions of said top panel, and means at the front end of said top panel inwardly from said gutter providing an aperture adjacent and above the front wall of said body for the passage of air, and means spaced from said aperture for the drainage of liquids from said gutter at the lowermost portions of the gutter slope.

4. In a vehicle construction, a body having windowed generally upstanding front, side and rear walls, a top panel of turtle-back-like configuration having laterally extending margins beyond the side walls of said body, portions on said side walls retainingly secured to said top panel, said top panel margins providing a gutter for said top panel, means on the front end of said top panel inwardly from said gutter providing an aperture adjacent and above the front wall of said body for the passage of air, and peripherally spaced means for the drainage of liquids from said gutter.

5. In a vehicle construction, a body having windowed generally upstanding front, side and rear walls, a top panel of turtle-back-like configuration having laterally downwardly extending margins beyond the side walls of said body, outwardly directed portions on said side walls retainingly secured to said top panel, said top panel having means providing a gutter at the outer edge of said margins, means at the front end of said top panel inwardly from said gutter providing an aperture adjacent and above the front wall of said body for the passage of air, and means spaced from said aperture about said margin for the drainage of liquids from said gutter.

6. In a roof construction for a vehicle body, a top panel of sheet material, the front end portion of said panel providing a front visor, and a downwardly struck transverse section of said panel adapted to be secured to the upper end of the front wall of the body and defining an air relief passage rearwardly of said front visor.

7. In a roof construction for a vehicle body, a top panel of sheet material, the front end portion of said panel affording a front visor, and a downwardly struck transverse section of said panel secured to the front wall of the vehicle body, the aperture provided by striking out of said section defining an air relief passage rearwardly of said front visor.

8. In a roof construction for a vehicle body, a top panel, a transverse forwardly extending portion on the front wall of the body, means securing the front end of said top panel to the outer forward end of said extending portion to define a front visor, a downwardly struck transverse section of said panel secured to said front wall and providing an opening in said panel, and an upwardly struck transverse section in said forwardly extending portion providing an opening in said forwardly extending portion complementary to said top panel opening to afford an air relief passage for said visor.

9. In an automobile, a body having an upwardly and rearwardly sloping front windowed wall, a top panel having a marginal portion extending forwardly beyond the upper end of said windowed wall, said top panel having a transverse opening therein substantially in alignment with the front surface of said upwardly and rearwardly sloping windowed wall, and a transverse section integral with said top panel curving downwardly from the rear boundary of said opening to the top of said front wall, and means securing the edge of said section to the upper end of said wall.

10. A roof construction for an automobile having an upwardly and rearwardly sloping front windowed wall, comprising a top panel having a marginal portion adapted to extend forwardly beyond the upper end of the sloping front wall to provide a visor, said top panel having a transverse opening therein for alignment with the front surface of the sloping front windowed wall, and an air ramp for connecting said top panel and the front wall and for directing air flow from the front wall through said transverse opening.

11. In an automobile, a body having a windowed wall, a top panel having a marginal portion extending outwardly beyond the upper end of said windowed wall, a flanged portion extending outwardly from said wall, an upwardly open curled edge on said flange portion, and an upwardly open curled edge on said marginal portion nested in said curled edge of said flange portion to form a gutter.

GEORGE ALBERT LYON.

References Cited in the file of this patent

UNITED STATES PATENTS

| Number | Name | Date |
| --- | --- | --- |
| 1,357,220 | Buesing | Nov. 2, 1920 |
| 1,511,172 | McArthur | Oct. 7, 1924 |
| 1,528,904 | Winans | Mar. 10, 1925 |
| 2,209,563 | Deisley | July 30, 1940 |
| 2,231,293 | Norman | Feb. 11, 1941 |
| 2,253,353 | Sharp | Aug. 19, 1941 |